(12) United States Patent
Urbach

(10) Patent No.: US 7,481,595 B2
(45) Date of Patent: Jan. 27, 2009

(54) BALL JOINT

(75) Inventor: Brian A. Urbach, Rochester Hills, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 29 days.

(21) Appl. No.: 11/516,236

(22) Filed: Sep. 6, 2006

(65) Prior Publication Data
US 2008/0056811 A1    Mar. 6, 2008

(51) Int. Cl.
*F16C 11/06* (2006.01)

(52) U.S. Cl. .................. 403/149; 403/145; 280/93.511

(58) Field of Classification Search ................. 403/122, 403/134, 145, 149, 223, 225; 280/93.511, 280/93.512, 86.756
See application file for complete search history.

(56) References Cited

U.S. PATENT DOCUMENTS

| | | | | |
|---|---|---|---|---|
| 1,281,769 A | * | 10/1918 | Edmonston | ................. 403/146 |
| 1,392,561 A | * | 10/1921 | Duffy | ......................... 403/146 |
| 1,912,451 A | * | 6/1933 | Hibbard | ....................... 403/225 |
| 2,208,325 A | * | 7/1940 | Krutsch | ................. 280/93.511 |
| 2,444,658 A | * | 7/1948 | Lucas | ..................... 280/93.511 |
| 2,456,793 A | * | 12/1948 | Reed et al. | ................... 403/122 |
| 2,474,959 A | * | 7/1949 | Rieves | ................... 280/93.511 |
| 2,483,621 A | * | 10/1949 | Burnett | ................. 280/93.511 |
| 2,513,637 A | * | 7/1950 | Herreshoff et al. | .......... 403/122 |
| 2,523,321 A | * | 9/1950 | Nelson | ........................ 403/148 |
| 5,538,275 A | | 7/1996 | Lomnicki | |
| 6,076,247 A | | 6/2000 | Durand | |
| 6,334,620 B1 | | 1/2002 | Reetz et al. | |
| 6,834,863 B2 | | 12/2004 | Urbach | |
| 7,367,743 B2 | * | 5/2008 | Bernhardt et al. | ........... 403/122 |

* cited by examiner

*Primary Examiner*—Michael P Ferguson
(74) *Attorney, Agent, or Firm*—MacMillan, Sobanski & Todd, LLC

(57) ABSTRACT

An improved ball joint for use in a motor vehicle steering or suspension system comprises a ball joint having a shank portion and a ball portion disposed in a socket shell. A ball joint retention member is provided having a first end operatively secured to the socket shell and a second end operatively secured to the shank portion.

10 Claims, 7 Drawing Sheets

BALL JOINT

BACKGROUND OF THE INVENTION

This invention relates in general to vehicle steering or suspension systems and in particular to an improved ball joint for use in such a motor vehicle steering or suspension system.

Ball joints provide an articulated connection between two relatively movable parts. Ball joints are commonly used in motor vehicle steering systems and in motor vehicle suspension systems.

In a vehicle steering or suspension system, ball joints are commonly provided to support a first vehicle component, such as a for example a steering knuckle or steering yoke, for movement relative to a second vehicle component, such as for example a control arm, steering yoke or steering knuckle. Typically, a ball joint for a motor vehicle steering system includes a ball stud with a spherical ball end and a socket member with a spherical socket. A bearing member in the socket receives the ball end and supports the ball end for rotational and pivotal movement.

SUMMARY OF THE INVENTION

This invention relates to an improved ball joint for use in a vehicle suspension or steering system. According to the illustrated embodiments, the ball joint has a shank portion and a ball portion disposed in a socket shell. A ball joint retention member is provided having a first end operatively secured to the socket shell and a second end operatively secured to the shank portion.

Other advantages of this invention will become apparent to those skilled in the art from the following detailed description of the preferred embodiment, when read in light of the accompanying drawings.

DETAILED DESCRIPTION OF THE INVENTION

Figure 1:
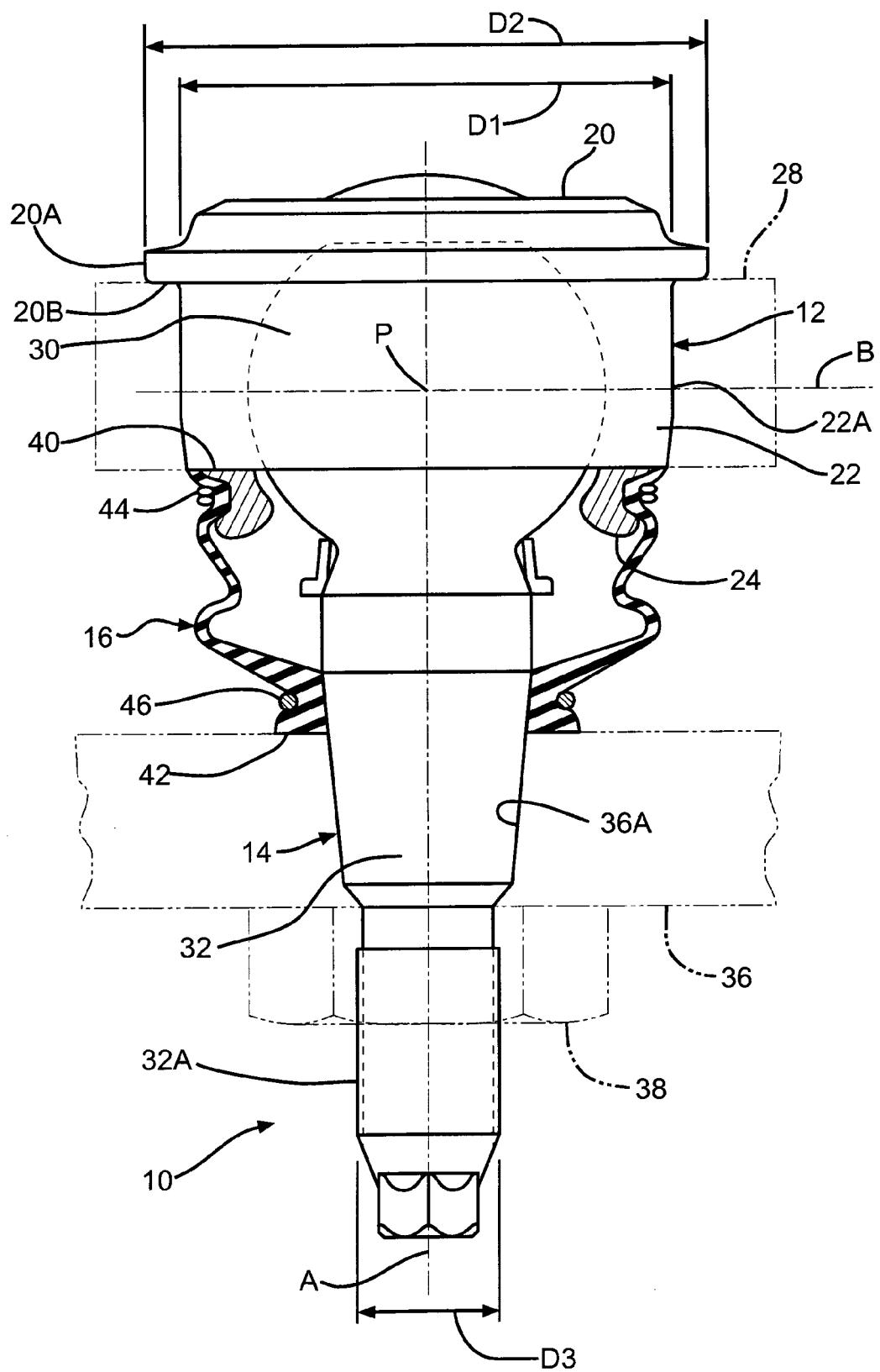
FIG. 1 is a view of a portion of a prior art ball joint.

Referring now to FIG. 1, there is illustrated a portion of a prior art "tension style" ball joint, indicated generally at 10. The general structure and operation of the prior art ball joint 10 is conventional in the art. Thus, only those portions of the prior art ball joint 10 which are necessary for a full understanding of this invention will be explained and illustrated in detail. As is well known in the art, the prior art ball joint 10 interconnects relatively movable vehicular parts, such as for example, a control arm, steering knuckle or steering yoke, with a control arm, steering yoke or steering knuckle.

As shown in prior art FIG. 1, the ball joint 10 defines an axis A and includes a socket shell or housing 12, a ball stud 14, and a seal 16. The socket shell 12 is formed of a rigid material, such as for example, steel, and is centered on the axis A. The socket shell 12 has a first end portion 20, a main body 22, and a second end portion 24. The main body 22 includes a cylindrical outer surface 22A which defines a first outer diameter D1. The first end portion 20 includes an enlarged flange 20A and a shoulder 20B at the transition from the cylindrical outer surface 22A to the flange 20A. The flange 20A defines a second outer diameter D2 which is greater than the first outer diameter D1. The socket shell 12 is adapted to be connected to a suitable first vehicle suspension component (shown in phantom schematically in prior art FIG. 1 by reference character 28), in a known manner, such as for example, by a press or interference fit with the main body 22 of the socket shell 12. The first vehicle suspension component 28 may be a control arm or steering yoke or steering knuckle, for example.

The ball stud 14 is formed from a suitable material, such as steel, and is centered on the axis A. The ball stud 14 includes a central ball portion 30 and a shank portion 32. The central ball portion 30 has a centerline B which extends perpendicular to the axis A. A pivot center P of the ball joint 10 is located on the axis A at the intersection of the axis A and the centerline B. The shank portion 32 includes an externally threaded section 32A and a tapered section 34. The tapered section 32A of the shank portion 32 defines an outer diameter D3.

The prior art ball joint 10 further includes one or more bearings (not shown) are disposed in the socket shell 12 about the ball portion 30 to support the ball stud 14 for movement about the pivot center P. The shank portion 32 of the ball stud 14 is adapted to be connected to a suitable second vehicle suspension component (shown in phantom schematically in FIG. 1 by reference character 36 and having a complimentary tapered opening 36A formed therethough), in a known manner, such as for example, by installing a nut 38 onto the externally threaded section 32A of the shank portion 32 and tightening the nut 38 to a predetermined torque. The second vehicle suspension component 36 may be a control arm or steering yoke or steering knuckle, for example.

The boot seal 16 is formed from a suitable elastomeric material, such as for example, Neoprene, which is available from Dupont. The boot seal 16 includes a first end 40 which is disposed about the second end 24 of the socket shell 12 and a second end 42 which is disposed about the shank portion 32 of the ball stud 14. As shown in prior art FIG. 1, a first retaining ring 44 is provided to secure the first end 40 of the seal about the second end 24 of the socket shell 12 and a second retaining ring 46 is provided to secure the second end 42 of the seal 16 about the shank portion 32 of the ball stud 14. The structure and operation of the prior art ball joint 10 thus far described is conventional in the art.

Figure 2:
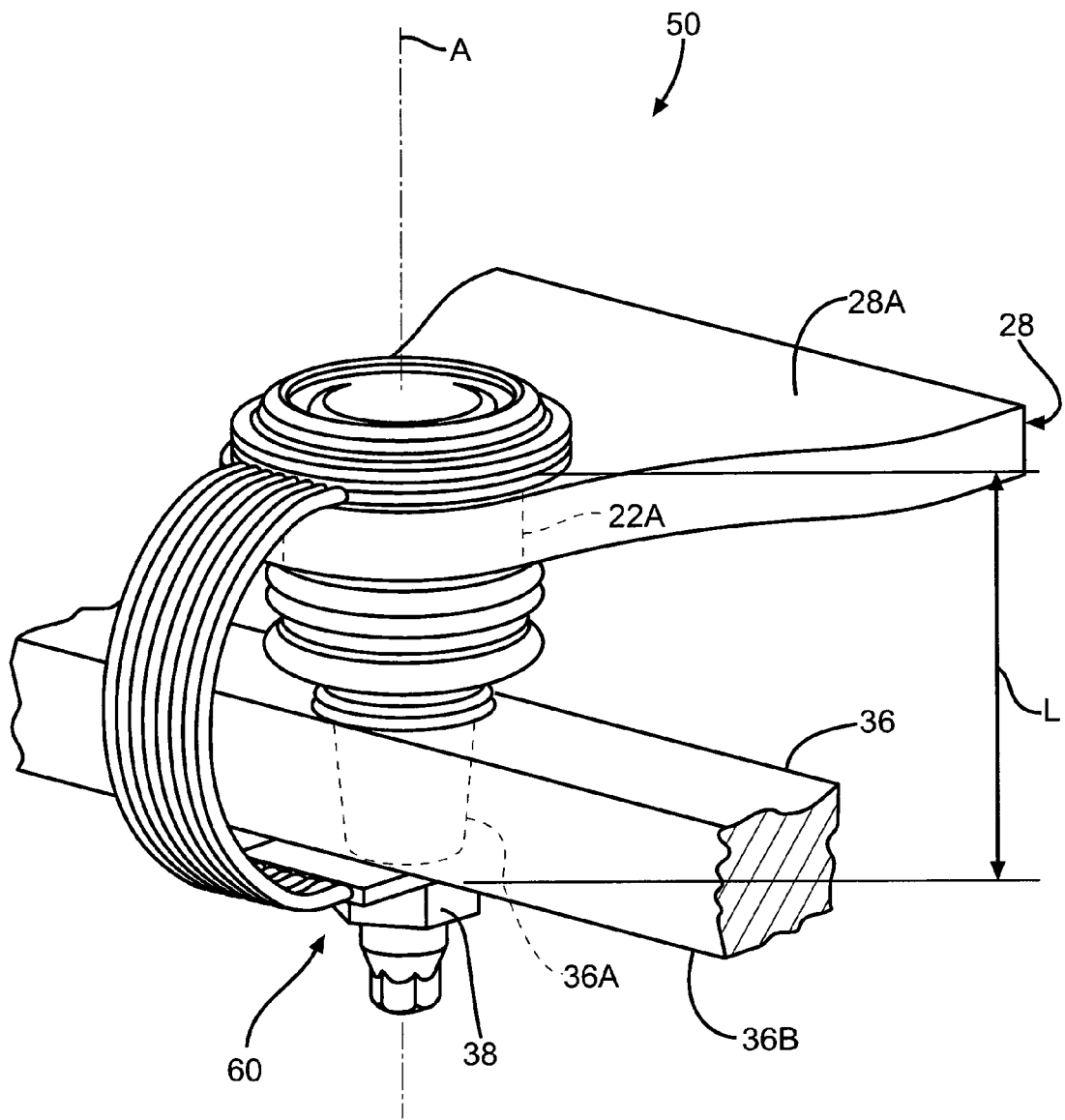
FIG. 2 is a view of a portion of a vehicle steering or suspension system including a first embodiment of a ball joint.

Turning now to FIG. 2 and using like reference numbers to indicate corresponding parts, there is illustrated in FIG. 1 a portion of a vehicle steering or suspension system, indicated generally at 50, including a first embodiment of a ball joint tether or retention member, indicated generally at 60, for use with the ball joint 10. The general structure and operation of the vehicle steering or suspension system 50 is conventional in the art. Thus, only those portions of the vehicle steering or suspension system 50 which are necessary for a full understanding of this invention will be explained and illustrated in detail. Also, although the ball joint tether 60 will be described and illustrated in connection with the particular type of vehicle steering or suspension system 50 and preferably the tension style ball joint 10 disclosed herein, it will be appreciated that the ball joint 60 may be used in connection with other kinds of vehicle steering or suspension systems. For example, the ball joint tether 60 may be used in non-tension style ball joints and/or in the vehicle steering or suspension systems shown in U.S. Pat. No. 5,427,395 Urbach, U.S. Pat. No. 6,042,294 Urbach, and U.S. Pat. No. 6,834,863 Urbach, the disclosures of each of these patents hereby incorporated by reference in entirety herein. Also, the particular orientation of the ball joint 10 may be other than illustrated if so desired.

In the illustrated embodiment of FIG. 2, the ball joint tether or retention member 60 is an "external" tether and is formed from a suitable material and includes a first "tether securing" end 62, a second "tether securing" end 64, and an intermediate "tether" or connecting portion 66. The first end 62, second end 64 and connecting portion 66 may be formed from similar materials or may be formed from two or more different materials if so desired.

In the illustrated embodiment, the first end 62 is preferably formed from steel, the second end 64 is preferably formed from steel, and the connecting portion 66 is preferably formed from steel. More preferably, the connecting portion 66 is formed from a suitable high strength preferably corrosion resistant material. In the illustrated embodiment, the connecting portion 66 is preferably formed from one or more strands of steel material which are secured to the first end 62 and the second end 64 by suitable means, such as for example by crimping, welding or both or by other suitable securing methods. In the illustrated embodiment, the connecting portion 66 is formed from a plurality of steel strands which may be separated from one another or connected to each other. Alternatively, the construction and/or the material of the ball joint tether 60 may be other than illustrated if so desired. For example, the first end 62 and the second end 64 may be formed from other suitable metal and/or non-metal materials, such as for example, carbon fiber, Kevlar, or plastics, and the connecting portion 66 may be formed from other suitable metal and/or non-metal materials, such as for example, carbon fiber, Kevlar, or plastics.

Figure 3:
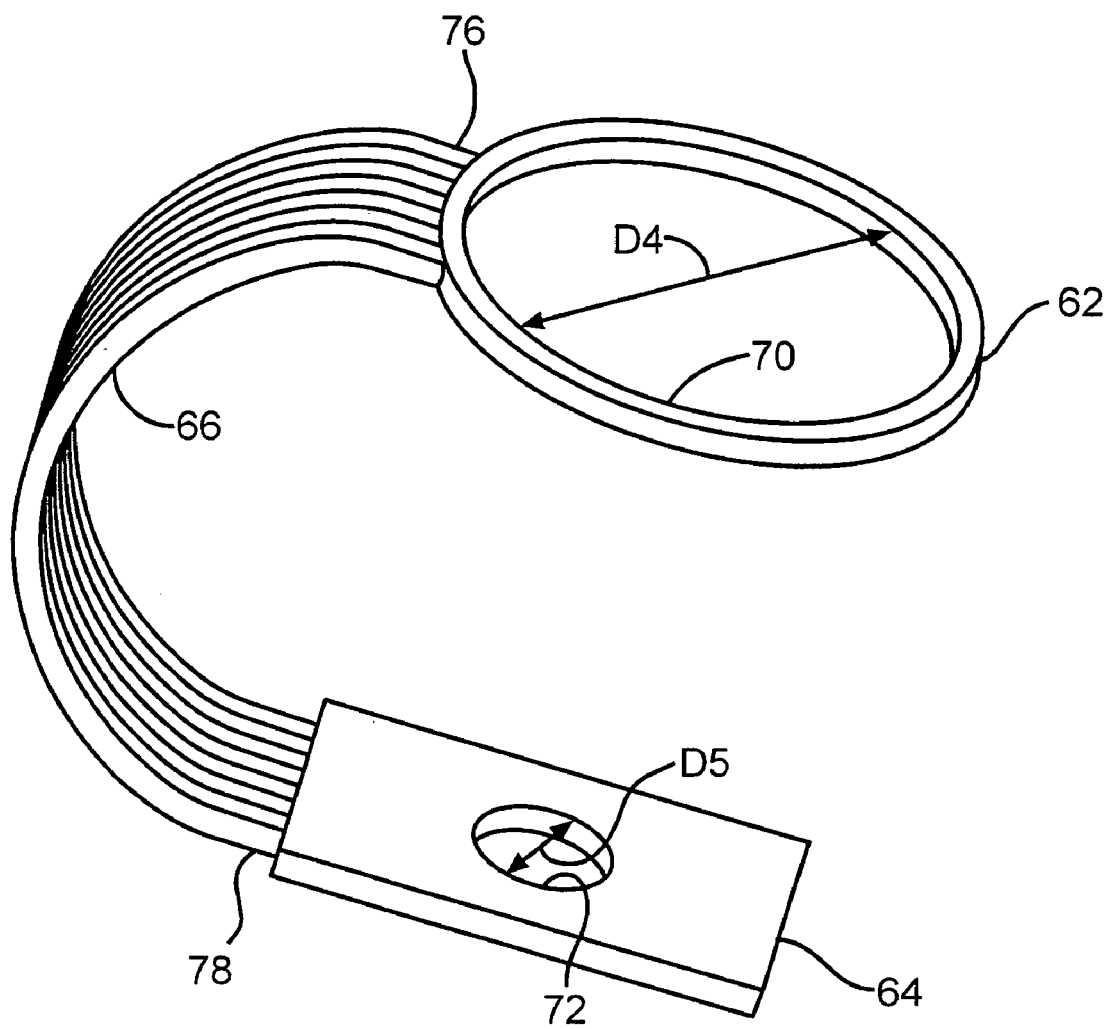
FIG. 3 is a view of a component of the first embodiment of the ball joint.

As best shown in FIG. 3, in the illustrated embodiment, the first end 62 is preferably in the shape of a generally flat, circular shaped plate and is provided with an opening 70 formed therethough. In the illustrated embodiment, the opening 70 in the first end 62 of the ball joint tether 60 is preferably circular and defines a tether first end inner diameter D4. Preferably, as will be discussed below, the first end inner diameter D4 is generally equal to or slightly greater than the outer diameter D1 of the socket housing 12 and less than the outer diameter D2 of the enlarged flange 20A of the first end 20 of the socket housing 12. Alternatively, the shape of the first end 62 of the ball joint tether 60 may be other than illustrated if so desired. For example, the first end 62 may have a generally square or rectangular shape and/or the shape of the opening formed therein may be other than circular if so desired.

As best shown in FIG. 3, in the illustrated embodiment, the second end 64 is in the shape of a generally flat, rectangular shaped plate and is provided with an opening 72 formed therethough. In the illustrated embodiment, the opening 72 in the second end 62 of the ball joint tether 60 is preferably circular and defines a tether second end inner diameter D5. In the illustrated embodiment, the tether second end inner diameter D5 is less than the tether first end inner diameter D4 and, as will be discussed below, the second end inner diameter D4 is generally equal to or slightly greater than the outer diameter D3 of the externally threaded section 32A of the shank portion 32 of the ball stud 14. Alternatively, the shape of the second end 64 of the ball joint tether 60 may be other than illustrated if so desired. For example, the second end 64 may have a generally square or hoop-like collar shape and/or the shape of the opening formed therein may be other than circular if so desired.

In the illustrated embodiment, the connecting portion 66 is preferably in the shape of a generally at least somewhat "flexible" strap or joint and includes a first end 76 and a second end 78. The first end 76 is connected or joined to the first end 62 of the ball joint tether 10 by suitable means. Similarly, the second end 78 is connected or joined to the second end 64 of the ball joint tether 10 by suitable means.

In the illustrated embodiment, the connecting portion 66 preferably defines an overall length in its fully extended or "stretched out" position (not shown) which is preferably at least greater than a length L defined between the shoulder 20B of the flange 20A of the socket housing 12 and a surface 36B of the vehicle suspension component 36. More preferably, the overall length of the connecting portion 66 is at least slightly greater than a chord length of the associated ball joint when the joint is in its maximum length which occurs during the maximum oscillation of the ball joint to thereby allow free movement of the joint without any interference or constraint from the ball joint tether 60.

As discussed above, in the illustrated embodiment, the strap first end 76 is preferably connected to the ball joint tether first end 62 by suitable means, such as for example by welding, crimping or other suitable methods and the strap second end 78 is preferably connected to the ball joint tether second end 64 by suitable means, such as for example by welding, crimping or other suitable methods. However, depending upon the particular materials of the first end 62, the second end 64, and the connecting portion 66, the construction and/or connection of one or both of the ends 62 and 64 and/or the connection portion 66 of the ball joint tether 60 may be other than illustrated if so desired.

As shown in FIGS. 2 and 3, the first end 62 of the ball joint tether 60 is disposed and preferably clamped or captured between the shoulder 20B of the flange 20A of the first end 20 of the socket housing 12 and an adjacent surface 28A of the first vehicle suspension component 28. The second end 64 of the ball joint tether 60 is disposed and preferably clamped or captured between the nut 38 and the adjacent surface 36B of the second vehicle suspension component 36.

Figure 4:
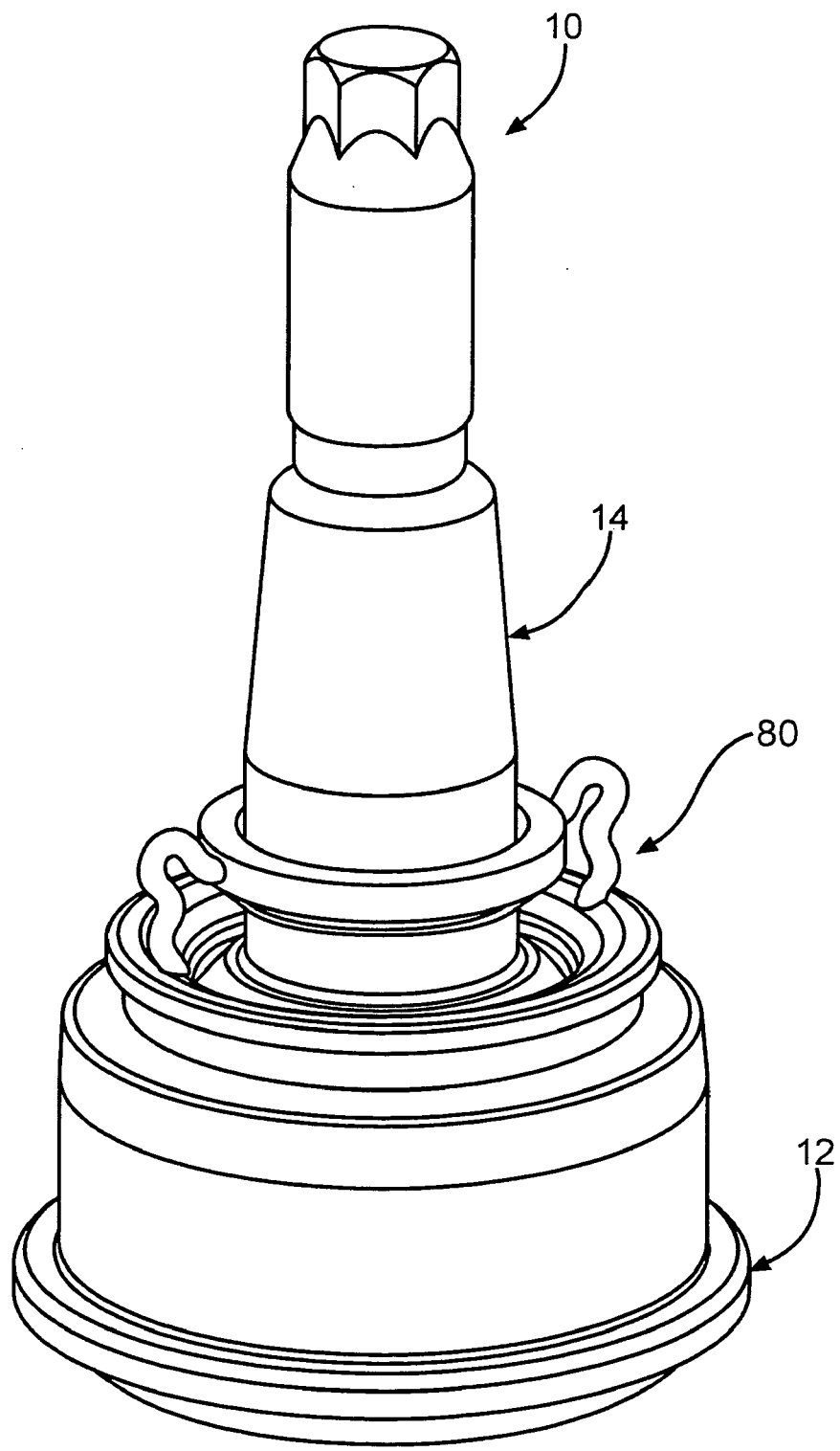
FIG. 4 is a view of a portion of a second embodiment of a ball joint adapted for use in a vehicle steering or suspension system, showing the ball joint without a seal installed therein.
Figure 5:
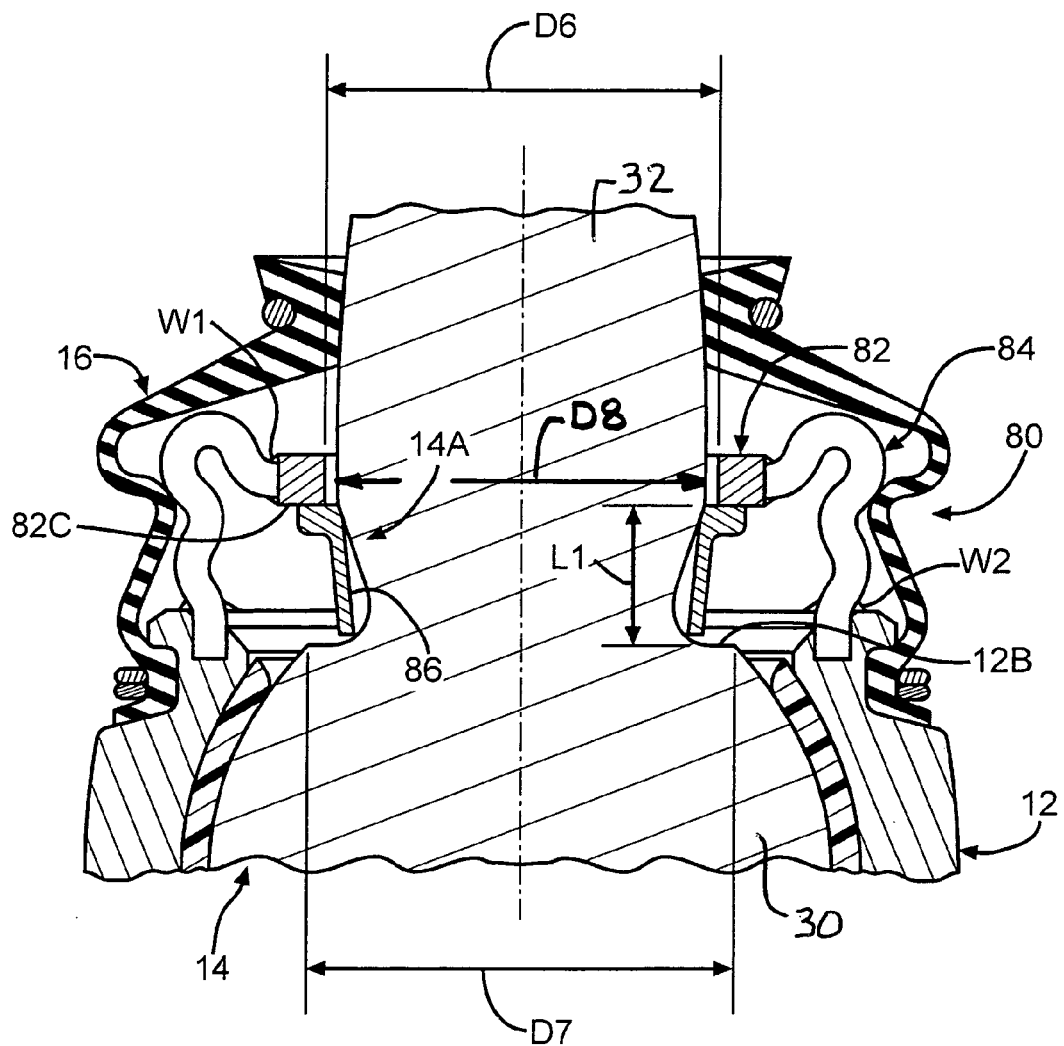
FIG. 5 is a sectional view of a portion of the second embodiment of the ball joint illustrated in FIG. 4, showing the ball joint with the seal installed.
Figure 6:
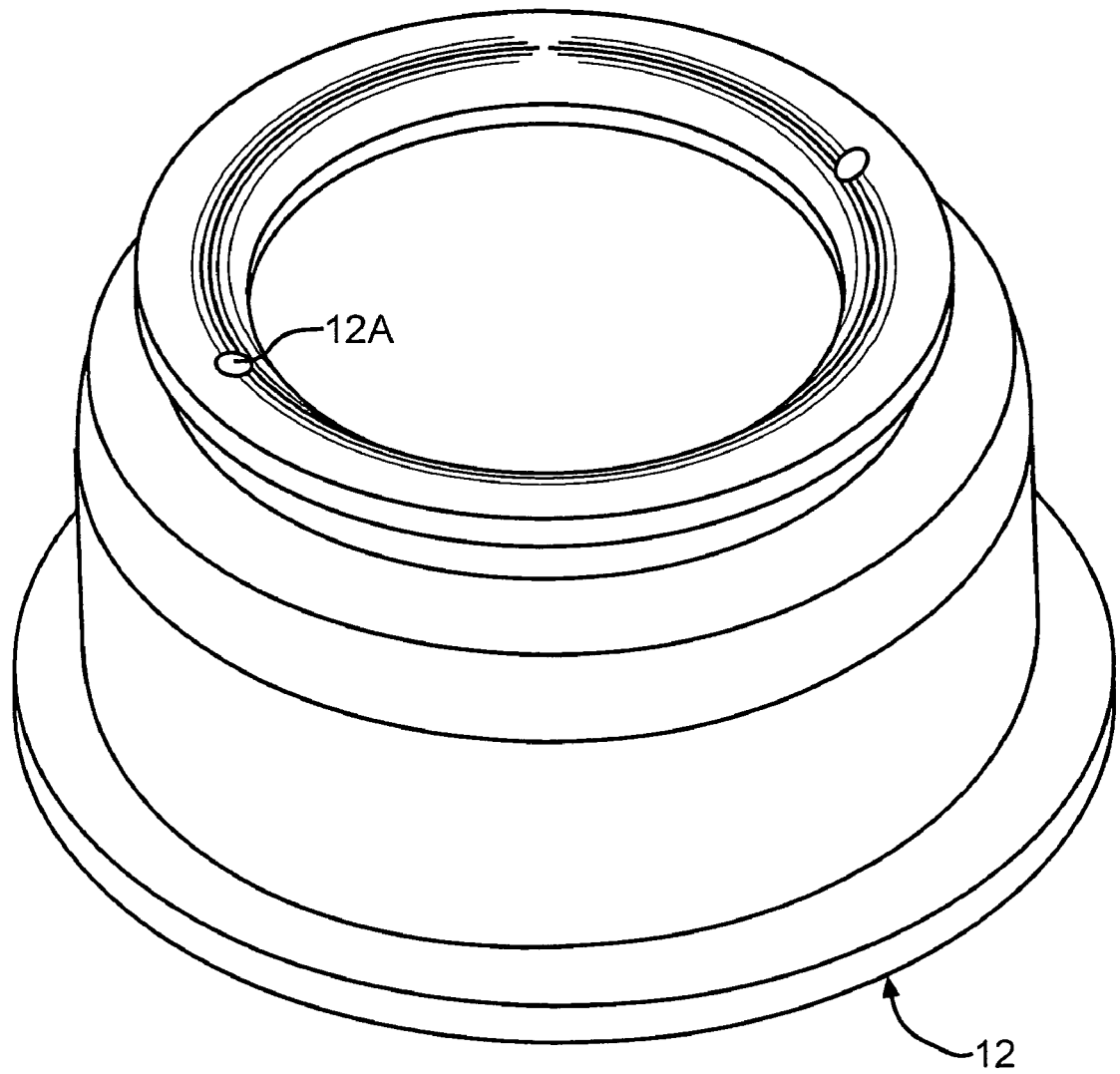
FIG. 6 a view of a component of the second embodiment of the ball joint.

Turning now to FIGS. 4 and 5 and using like reference numbers to indicate corresponding parts, there is illustrated a second embodiment of a ball joint tether or retention member, indicated generally at 80, for use with the ball joint 10 (the seal 16 not being shown in FIG. 4). As shown therein, in the illustrated embodiment, the ball joint tether 80 or retention member is an "internal" tether and is formed from a suitable material and includes a first "tether securing" member 82 and a plurality of second "tether" or connecting members 84. In the illustrated embodiment, the ball joint tether 80 includes two second connecting members 84. Alternatively, the number of the second connecting members 84 may be other than illustrated if so desired. The first member 82 and the second members 84 may be formed from similar materials or may be formed from two or more different materials if so desired.

In the illustrated embodiment, the first member 82 is preferably formed from steel and the second members 84 are preferably formed from steel. More preferably, the second members are 84 are formed from strands of steel material which are secured to the first member 82 by suitable means, such as for example by crimping, welding or both or by other suitable methods. Alternatively, the construction and/or the material of the ball joint tether 80 may be other than illustrated if so desired. For example, the first member 82 may be formed from other suitable metal and/or non-metal materials, such as for example, carbon fiber, Kevlar, or plastics, and the second members 84 may be formed from other suitable metal and/or non-metal materials, such as for example, carbon fiber, Kevlar, or plastics.

In the illustrated embodiment, the first member 82 is a generally annular shaped washer-like member and is disposed on the shank portion 32 of the ball stud 14. As best shown in FIG. 5, the washer 82 defines a washer inner diameter D6 which is less than a diameter D7 defined by the associated ball portion 30 of the ball stud 14. Also, as shown in the illustrated embodiment of FIG. 5, the washer inner diameter D6 is preferably slightly greater than an outer diameter D8 defined by the associated shank portion 32 of the ball stud 14 on which is it disposed.

Preferably, as shown in the embodiment illustrated in FIG. 5, a support collar 86 is provided and is disposed on the ball stud 14 so as to position the washer 82 away from a neck area, indicated generally at 14A, of the ball stud 14 so as not to obstruct the relative movement between the suspension components via the ball joint 10. The washer 82 and/or the support collar 86 may be secured and/or positioned on the ball stud 14 by suitable means. For example, the washer 82 and/or the support collar 86 may be positioned on the shank portion 34 of the ball stud 14 by a press or interference fit, by using of one or more retaining rings (not shown), or by welding or otherwise fixedly securing the washer 82 and/or the support collar 86 thereon in a predetermined position on the shank portion 32. Alternatively, the support collar 86 may be eliminated.

Figure 7:
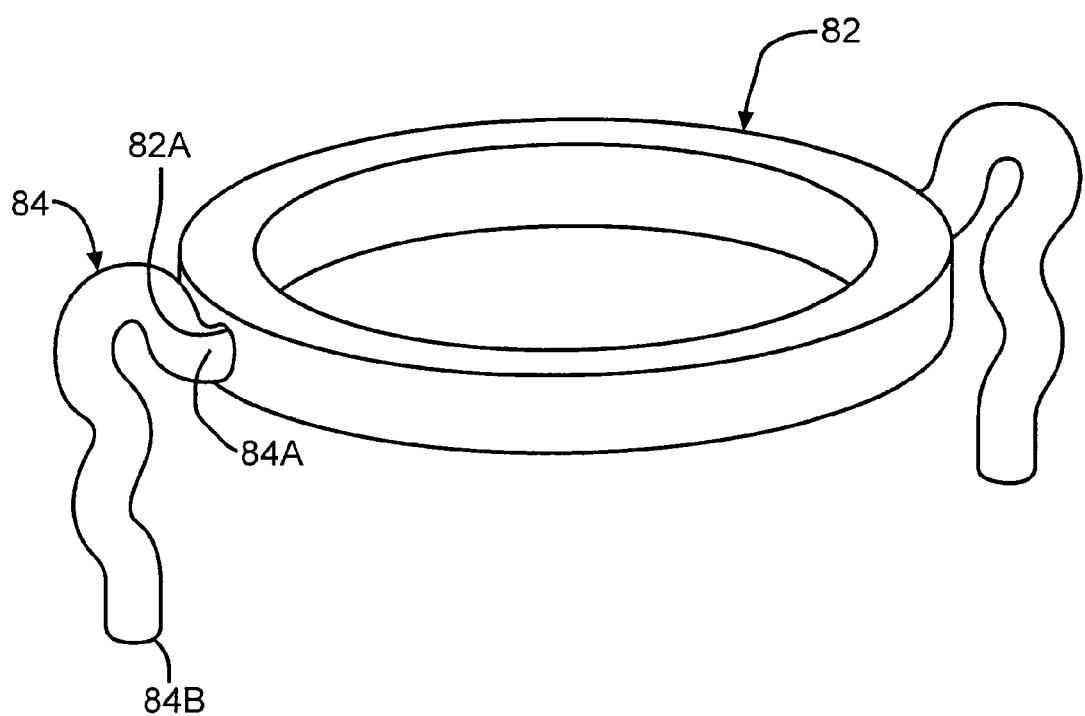
FIG. 7 a view of another component of the second embodiment of the ball joint.

In the illustrated embodiment, preferably at least two second members 84 are provided and are in the shape of generally at least somewhat "flexible" strands or straps and are attached at a first end 84A thereof to the washer 82 and at a second end 84B thereof to the socket housing 12. To accomplish this in the preferred embodiment, the first end 84A is inserted into an opening 82A (shown in FIG. 7), provided in the washer 82 and fixedly secured therein by suitable means, such as for example welding (shown at W1 in FIG. 5), crimping, or other suitable methods. The second end 84B of the second member 84 is inserted into an opening 12A (shown in FIG. 7), provided in the socket shell 12 and fixedly secured therein by suitable means, such as for example welding (shown at W2 in FIG. 5), crimping, or other suitable methods.

In the illustrated embodiment, the second members 84 define an overall length in their fully extended or "stretched" position (not shown) which is preferably greater than a length L1 defined between a surface 82C of the washer 82 and a surface 12B of the ball stud 12. More preferably, the overall length of the connecting portion 66 is at least slightly greater than a chord length of the associated ball joint when the joint is in its maximum length which occurs during the maximum oscillation of the ball joint to thereby allow free movement of the joint without any interference or constraint from the ball joint tether 80. Alternatively, the construction, number, material and/or shape of the ball joint tether 80 may be other than illustrated if so desired.

The principle and mode of operation of this invention have been described in its various embodiments. However, it should be noted that this invention may be practiced otherwise than as specifically illustrated and described without departing from its scope.

What is claimed is:

1. A vehicle suspension system comprising:
a first suspension member having a first through bore;
a second suspension member having a second through bore;
a ball joint having a shank portion and a ball portion disposed in a socket shell, said ball joint operatively disposed between said first suspension member and said second suspension member for operatively supporting said first suspension member for movement relative to said second suspension member, said ball joint having a first end disposed adjacent said first suspension member and a second end disposed adjacent said second suspension member; and
a ball joint retention member having a first end operatively secured to a first end of said socket shell and a second end operatively secured to said shank portion; wherein said socket shell has a closed end and an open end, said shank portion extending through said open end;
wherein said socket shell defines a first outer diameter, said first end of said socket shell includes a flange at said closed end of said socket shell which defines a second outer diameter which is greater than said first outer diameter of said socket shell, and said first end of said ball joint retention member includes an opening which defines a first end inner diameter which is generally equal to or slightly greater than said first outer diameter of said socket shell and less than said second outer diameter of said flange to enable said first end of said ball joint retention member to be captured between said flange of said first end of said socket shell and an adjacent surface of said first suspension member when said socket shell extends through said first through bore and said opening; and
wherein said external retention member has an intermediate connecting portion extending between said first and second ends of said ball joint retention member, wherein said second end of said ball joint retention member is operatively captured between said second suspension member and a fastener provided on said shank portion when said shank portion extends through bore and an opening in said second end of said ball joint retention member.

2. The vehicle suspension system of claim 1 wherein said ball joint retention member is an external retention member.

3. The vehicle suspension system of claim 1 wherein said intermediate connecting portion is a tether strap formed from a generally flexible high strength material.

4. The vehicle suspension system of claim 1 wherein said first end is a generally flat plate having a circular opening formed therein, said second end is a generally flat plate having a circular opening formed therein, and said intermediate connecting portion is a tether strap formed from a generally flexible high strength material having opposed ends operatively connected to said plates of said first and second ends.

5. The vehicle suspension system of claim 1 wherein said ball joint retention member includes at least one tethering strap.

6. The vehicle suspension system of claim 5 wherein said tethering strap is formed from a generally flexible high strength material.

7. The vehicle suspension system of claim 1 wherein said ball joint retention member includes an intermediate connecting portion which extends between said first and second ends, and wherein said intermediate connecting portion defines an overall length which is at least slightly greater than a chord length of said ball joint when said ball joint is at a maximum length which occurs during a maximum oscillation of said ball joint to thereby allow free movement of said ball joint without any constraint from said ball joint retention member.

8. A vehicle suspension system comprising:
a first suspension member having a first through bore;
a second suspension member having a second through bore;

a ball joint having a shank portion and a ball portion disposed in a socket shell, said ball joint operatively disposed between said first suspension member and said second suspension member for operatively supporting said first suspension member for movement relative to said second suspension member, said ball joint having a first end disposed adjacent said first suspension member and a second end disposed adjacent said second suspension member; and an external ball joint retention member having a first end, a second end and an intermediate connecting portion, said first end operatively secured to a first end of said socket shell, said second end operatively secured to said shank portion, and said intermediate connecting portion being formed from a generally flexible high strength material;

wherein said socket shell has a closed end and an open end, said shank portion extending through said open end;

wherein said socket shell defines a first outer diameter, said first end of said socket shell includes a flange at said closed end of said socket shell which defines a second outer diameter which is greater than said first outer diameter of said socket shell, and said first end of said ball joint retention member includes an opening which defines a first end inner diameter which is generally equal to or slightly greater than said first outer diameter of said socket shell and less than said second outer diameter of said flange to enable said first end of said ball joint retention member to be captured between said flange of said first end of said socket shell and an adjacent surface of said first suspension member when said socket shell extends through said first through bore and said opening; and wherein said second end of said ball joint retention member is operatively captured between said second suspension member and a fastener provided on said shank portion when said shank portion extends through said second through bore and an opening in said second end of said ball joint retention member.

9. The vehicle suspension system of claim 8 wherein said intermediate connecting portion defines an overall length which is at least slightly greater than a chord length of said ball joint when said ball joint is at a maximum length which occurs during a maximum oscillation of said ball joint to thereby allow free movement of said ball joint without any constraint from said ball joint retention member.

10. The vehicle suspension system of claim 8 wherein said first end is a generally flat plate having a circular opening formed therein, said second end is a generally flat plate having a circular opening formed therein, and said intermediate connecting portion is a tether strap having opposed ends operatively connected to said plates of said first and second ends.

* * * * *

UNITED STATES PATENT AND TRADEMARK OFFICE
CERTIFICATE OF CORRECTION

PATENT NO. : 7,481,595 B2  Page 1 of 1
APPLICATION NO. : 11/516236
DATED : January 27, 2009
INVENTOR(S) : Brian A. Urbach It is certified that error appears in the above-identified patent and that said Letters Patent is hereby corrected as shown below:

Column 6, Claim 1, line 34, after "extends through" insert --said second through--.

Signed and Sealed this

Seventeenth Day of March, 2009

JOHN DOLL
*Acting Director of the United States Patent and Trademark Office*